US008234289B2

(12) United States Patent
Abernethy, Jr. et al.

(10) Patent No.: US 8,234,289 B2
(45) Date of Patent: Jul. 31, 2012

(54) RESTORATION OF CONVERSATION STUB FOR RECOGNIZED EXPERTS

(75) Inventors: Michael Negley Abernethy, Jr., Pflugerville, TX (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/958,176

(22) Filed: Dec. 17, 2007

(65) Prior Publication Data
US 2009/0157726 A1 Jun. 18, 2009

(51) Int. Cl.
*G06F 7/00* (2006.01)
*G06F 17/30* (2006.01)
(52) U.S. Cl. ...................................... 707/758
(58) Field of Classification Search .................. None
See application file for complete search history.

(56) References Cited

U.S. PATENT DOCUMENTS

| | | | | |
|---|---|---|---|---|
| 4,025,021 | A | | 5/1977 | Stout |
| 5,377,350 | A | * | 12/1994 | Skinner ........................ 719/316 |
| 5,577,163 | A | | 11/1996 | Theis |
| 5,790,114 | A | * | 8/1998 | Geaghan et al. .............. 715/763 |
| 5,867,144 | A | | 2/1999 | Wyard |
| 6,393,460 | B1 | | 5/2002 | Gruen et al. |
| 6,868,543 | B1 | * | 3/2005 | Nusbickel ..................... 719/318 |
| 7,310,781 | B2 | | 12/2007 | Chen et al. |
| 7,881,234 | B2 | | 2/2011 | Abernethy, Jr. et al. |
| 7,954,061 | B2 | | 5/2011 | McInerney |
| 7,991,128 | B2 | | 8/2011 | Abernethy, Jr. et al. |
| 2002/0107895 | A1 | * | 8/2002 | Timmer ........................ 707/530 |
| 2002/0133392 | A1 | * | 9/2002 | Angel et al. .................... 705/10 |
| 2002/0196284 | A1 | | 12/2002 | Berquist et al. |
| 2003/0167195 | A1 | * | 9/2003 | Fernandes et al. ............... 705/8 |
| 2003/0212746 | A1 | * | 11/2003 | Fitzpatrick et al. ........... 709/206 |
| 2004/0201630 | A1 | | 10/2004 | McInerney |
| 2004/0250215 | A1 | | 12/2004 | Chen et al. |
| 2005/0066287 | A1 | | 3/2005 | Tattrie et al. |
| 2005/0278180 | A1 | * | 12/2005 | O'Neill et al. ................ 704/275 |
| 2006/0090137 | A1 | | 4/2006 | Cheng et al. |
| 2006/0173702 | A1 | * | 8/2006 | Saxena et al. .................... 705/1 |
| 2007/0061468 | A1 | * | 3/2007 | Kelly et al. .................... 709/227 |
| 2007/0071206 | A1 | * | 3/2007 | Gainsboro et al. ............ 379/168 |
| 2007/0162549 | A1 | * | 7/2007 | Jin et al. ......................... 709/206 |
| 2007/0162560 | A1 | * | 7/2007 | Jin ................................ 709/217 |
| 2008/0077461 | A1 | * | 3/2008 | Glick ............................... 705/7 |
| 2008/0095348 | A1 | * | 4/2008 | Abernethy et al. ....... 379/202.01 |

(Continued)

OTHER PUBLICATIONS

A. Miller et al., Relieving the Burden of System Administration through Support Automation, 2000, USENIX, 14th USENIX Conference, pp. 167-180.*

(Continued)

*Primary Examiner* — Pierre Vital
*Assistant Examiner* — Taelor Kim
(74) *Attorney, Agent, or Firm* — Yee & Associates, P.C.; David A. Mims, Jr.

(57) ABSTRACT

A first conversation between a user of a communications device and a first party is monitored. A conversation stub that includes information relating to a topic of the first conversation is generated and stored. It is determined whether a second party of a second conversation between the user of the communications device and the second party has expertise regarding the topic of the first conversation. Responsive to determining that the second party has expertise regarding the topic of the first conversation, the conversation stub is presented to the user during the second conversation.

19 Claims, 3 Drawing Sheets

U.S. PATENT DOCUMENTS

2008/0201754 A1*  8/2008  Arling et al. .................. 725/114
2008/0235005 A1*  9/2008  Golan et al. ....................... 704/9

OTHER PUBLICATIONS

U.S. Appl. No. 11/550,832, filed Oct. 19, 2006, Abernethy, Jr. et al.

U.S. Appl. No. 11/555,440, filed Nov. 1, 2006, Abernethy, Jr. et al.

"Communicator Drag & Drop Specification", User Interface Group, 1998, Netscape Communications Corp., retrieved Aug. 23, 2011, 11 pages  http://www-archive.mozilla.org/docs/refList/user-interface/specs/dragndrop/.

* cited by examiner

RESTORATION OF CONVERSATION STUB FOR RECOGNIZED EXPERTS

BACKGROUND OF THE INVENTION

1. Field of the Invention

The present invention relates generally to the data processing field and, more particularly, to a computer implemented method, system and computer usable program code for managing conversational input.

2. Description of the Related Art

It often occurs that a user, while communicating by means of a communications device, purposely or inadvertently, fails to complete a particular topic of conversation. For example, during a conversation between two parties relating to a first topic, one of the parties may suddenly interrupt the conversation and begin discussing a second topic. Also, a telephone or instant messenger conversation between two parties may be prematurely interrupted because of a sudden failure of a communications device of one of the parties, for example, due to a power failure or computer crash. In either case, by the time the parties are willing or able to resume their interrupted conversation, the parties may have forgotten about the first topic or the context in which the conversation relating to the first topic occurred. In the case of an instant messaging conversation, in particular, the parties may not be able to access their instant messaging account to identify the topic of the conversation.

In either of the above situations, although one or both of the parties to the conversation may wish to resume and complete the interrupted topic of conversation, the parties may be unable to do so because of being unable to recall relevant details of the topic of conversation such as the purpose of the conversation or whether questions remained to be asked and/or answered.

Recognizing the difficulties of resuming an interrupted conversation, commonly assigned, copending U.S. patent application Ser. No. 11/555,440, filed Nov. 1, 2006, the disclosure of which is incorporated herein by reference, describes a mechanism by which a conversation between a user of a communications device and a second party is monitored for a triggering event indicative of an interruption of the conversation; and, responsive to detecting the triggering event, generates and stores a conversation stub that includes information relating to the topic of the conversation. At a later time, when the parties resume the conversation or initiate a new conversation, the user may request that the conversation stub be restored so that the interrupted topic of conversation can be recalled and completed.

Consider, however, a situation in which the interrupted topic of conversation relates to a matter in which the user has asked the other party to the conversation one or more questions about the topic. Because of the interruption, the user may not have received satisfactory answers to the questions. Although, the user may use a stored conversation stub to assist in recalling the topic of conversation and the unanswered questions when the conversation with the other party is resumed or when a new conversation with the other party is initiated, the user may not wish to wait until conversing again with the other party in order to receive answers to the questions. It would be useful in such a situation to be able to ask the same questions to any party with whom the user may be communicating and who might be able to provide satisfactory answers to the questions.

It would, accordingly, be desirable to provide a mechanism by which a conversation stub that includes information relating to an interrupted topic of conversation may be provided to the user so that the user may complete the interrupted conversation with any party that might have expertise in the topic of the interrupted conversation.

SUMMARY OF THE INVENTION

Exemplary embodiments provide a computer implemented method, system and computer usable program code for managing conversational input. A first conversation between a user of a communications device and a first party is monitored. A conversation stub that includes information relating to a topic of the first conversation is generated and stored. It is determined whether a second party of a second conversation between the user of the communications device and the second party has expertise regarding the topic of the first conversation. Responsive to determining that the second party has expertise regarding the topic of the first conversation, the conversation stub is presented to the user during the second conversation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
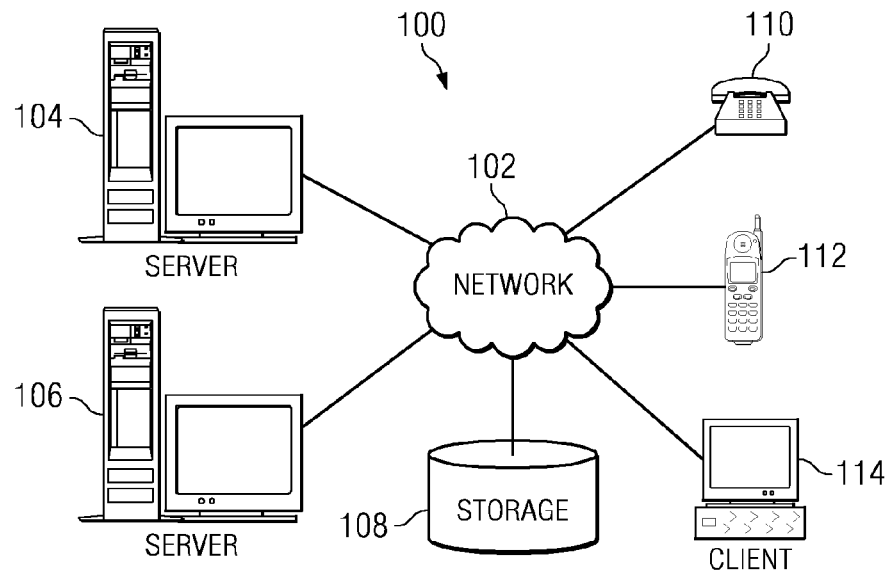
FIG. 1 depicts a pictorial representation of a network of data processing systems in which exemplary embodiments may be implemented.
Figure 2:
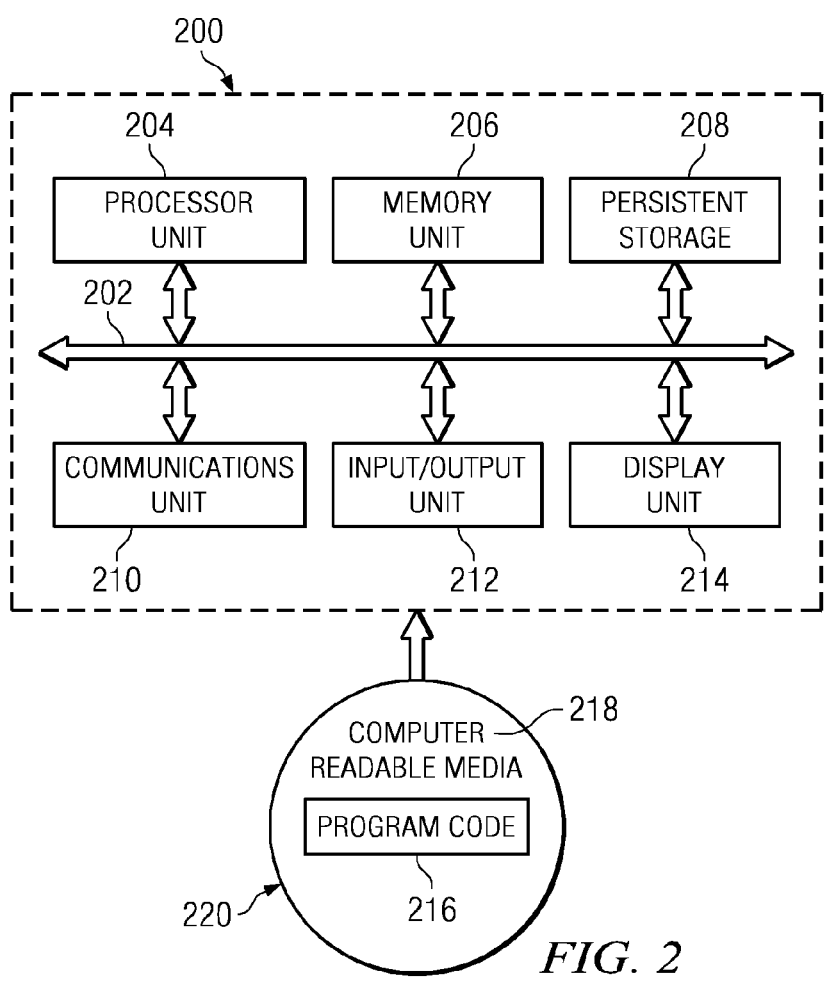
FIG. 2 illustrates a block diagram of a data processing system in which exemplary embodiments may be implemented.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, phone 110, PDA 112, and client 114 are coupled to network 102. Phone 110, personal digital assistant (PDA) 112, and client 114 are examples of communications devices used to transmit conversational input throughout network data processing system 100. Client 114 may be, for example, a personal computer or network computer. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 114 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different exemplary embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide a computer implemented method, system and computer usable program code for managing conversational input. A first conversation between a user of a communications device and a first party is monitored. A conversation stub that includes information relating to a topic of the first conversation is generated and stored. It is determined whether a second party of a second conversation between the user of the communications device and the second party has expertise regarding the topic of the first conversation. Responsive to determining that the second party has expertise regarding the topic of the first conversation, the conversation stub is presented to the user during the second conversation.

As used herein, a "conversation stub" is a data structure used to store information that serves as a reminder of a conversation. A conversation stub may be used to present a user of a communications device with information relating to a topic of conversation. One or more conversation stubs can be generated and stored during a conversation, and conversation stubs can be generated and stored for one or more conversations with one or more parties.

Information relating to a topic of conversation may include the last several seconds of an interrupted conversation, e.g., the last five seconds of a conversation, or any user-defined, predefined or default topic, subject matter, keyword, name or any description or any other descriptor or identifier such as a word, a combination of words, icons, numbers, letters, symbols, dates and times, or any combination thereof relating to conversational input. A conversation stub may also comprise a sequence of key strokes such as a text message or phone number.

Figure 3:
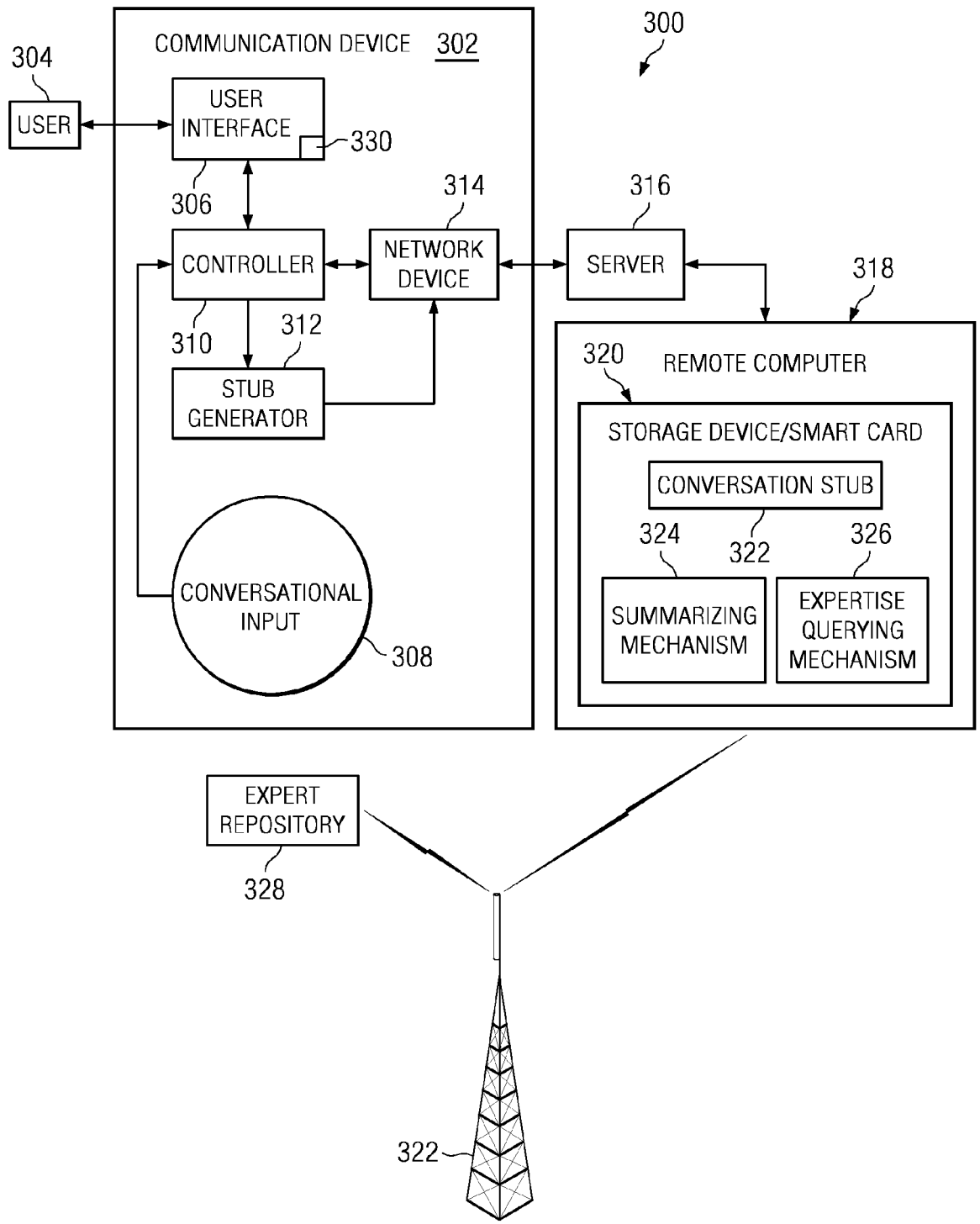
FIG. 3 is a block diagram that schematically illustrates a system for managing conversational input according to an exemplary embodiment.

FIG. 3 is a block diagram that schematically illustrates a system for managing conversational input according to an exemplary embodiment. The system is generally designated by reference number 300, and may be implemented in a data processing system such as data processing system 200 in FIG. 2.

System 300 includes communication device 302 for enabling the exchange of conversational input between a user 304 of communication device 302 and one or more other parties (not shown in FIG. 3) using one or more other communications devices. Communication device 302 may, for example, be implemented as one of devices 110, 112 and 114 in FIG. 1. Communication device 302 can be any device for receiving and/or sending conversational input including, but not limited to, a land phone, a cell phone, a PDA and a computer. Conversational input may be audio input, textual messages or be in another format. In the exemplary embodiment illustrated in FIG. 3, communication device 302 comprises a cellular telephone.

Communication device 302 includes user interface 306 that may be utilized by user 304 to operate communication device 302 in order to communicate with other parties, and to generate conversation stubs relating to conversational input, schematically illustrated at 308. User interface may be a touch screen, a graphical user interface (GUI), a keyboard, a mouse, an alphanumeric keypad, a voice recognition system or any other type of user interface.

User interface 306 may include an authentication mechanism 330 that requires authentication of user 304 before conversation stubs can be generated or presented. Authentication mechanism 330 may perform an authentication function in any desired manner. For example, user 304 may be required to input a user name and password via user interface 306 in order to be authenticated by authentication mechanism 330. Alternatively, authentication may be accomplished using voice recognition or in another manner.

Controller 310 receives and monitors conversational input 308 for an occurrence of a triggering event. Monitoring conversational input, as used herein, may include monitoring a conversation as well as monitoring ambient background noise occurring during a conversation. Detection of a triggering event by controller 310 results in stub generator 312 generating a conversation stub relating to a portion of conversational input 308.

A triggering event is a predefined event recognized by controller 310 that results in stub generator 312 generating a conversation stub at a given point in the conversation. A triggering event may comprise, for example, overlapping voices of parties to a conversation; a disconnected, dropped, or interrupted call; a voice inflection, or lack thereof; a level of background noise that exceeds a predetermined threshold; a predefined word or phrase uttered by a party to the conversation; or a user-initiated triggering event, such as a voice command or an operation of user interface 306 to generate a conversation stub. Thus, for example, if controller 310 detects multiple simultaneous voices, stub generator 312 may generate a conversation stub relating to the portion of conversational input 308 where the two voices overlap.

Controller 310 may also detect that a second speaker has begun speaking before a first speaker has concluded. For example, a voice inflection typically signals that a party to a conversation has finished communicating a thought. Accordingly, controller 310 may monitor conversational input 308 and generate a conversation stub if a second speaker begins speaking before the first speaker's voice inflection indicates that he or she has finished speaking. Further still, a raised tone of voice often signals that a second speaker intends to interrupt the first speaker, or that the speaker intends to introduce an important topic of conversation. Thus, controller 310 may also monitor conversational input 308 and generate a conversation stub as a party to a conversation raises his or her voice during the conversation in order to interrupt the other party.

In addition, a triggering event could be a word or phrase uttered by one of the participants to the conversation. For example, a wife calls her husband to remind him to pick up a bottle of wine on his way home from work. She may state, "Don't forget to pick up a bottle of wine for dinner." In this example, controller 310 may recognize the triggering event, which is the phrase "Don't forget," and in response, stub generator 312 generates a conversation stub relating to the conversation. A conversation stub in this example may include information relating to the topic of conversation: the triggering event "Don't forget," the terms "bottle of wine," and the keyword "dinner" in order to give the conversation stub context.

In addition, stub generator 312 may generate a conversation stub if controller 310 determines that the exchange of conversational input 308 has been interrupted. For example, referring back to the cell phone of the illustrative embodiment, if controller 310 detects that the call was dropped in the middle of the conversation, then stub generator 312 generates a conversation stub relating to the conversation immediately prior to the termination of the conversation, for example five seconds prior to the termination of the conversation. In this manner, user 304 can access the conversation stub relating to the conversation that was occurring at the point when the conversation prematurely terminated.

In accordance with an exemplary embodiment, a triggering event may also include a user-initiated triggering, such as a voice command or a user selection on user interface 306 to generate a conversation stub. A voice command can, for example, be a predefined word, phrase, or sentence uttered by user 304.

After generation of a conversation stub, the conversation stub is stored such that the conversation stub may later be referenced by user 304 during the course of utilizing communication device 302. Conversation stubs may be stored on communication device 302, or they may be stored on a remote storage device 320, for example, a storage device of a remote computer 318 as shown in FIG. 3. A stored conversation stub, designated by reference number 322, may be retrieved from the remote storage device by controller 310 and delivered to communication device 302, or to any other communication device on which user 304 is authenticated.

Storage of conversation stubs can be permanent or temporary. Permanent storage of a conversation stub permits user 304 to continually access and refer to the stored stub. Stub generator 312 can continue to generate conversation stubs for storage in storage device 320 as long as storage device 320 has capacity. When storage device 320 no longer has capacity to store additional stubs, newly generated conversation stubs may replace the oldest conversation stubs. Alternatively, in another exemplary embodiment, user 304 may be notified by controller 310 that storage device 320 lacks further capacity and may prompt user 304 to delete conversation stubs to free up additional memory. In this manner, users could reference, update, or delete stored conversation stubs as desired.

Yet further, and as will be described more fully hereinafter, a communication stub may be automatically deleted after the communication stub has been presented to the user to advise the user of the topic of an interrupted conversation and after the user has discussed the topic during a second conversation.

Stored conversation stub 322 may be presented to user 304 by communication device 302 in a format easily referenced by user 304, such as in a list or menu. The conversation stub may contain a date and time, or a keyword to permit a user to differentiate among a plurality of conversation stubs that may be listed.

Communication device 302 may also contain network adapters or other devices, such as network device 314 to enable communication device 302 to interact with other communications devices, data processing systems, remote printers or storage devices through intervening private or public networks. Network device 314 may comprise, for example, a wireless modem, cable modem, Ethernet card, wireless network card, transceiver components of a mobile phone, or any other known or available means for transmitting and/or receiving data. Remote server 316 is in turn coupled to remote computer 318 that includes data storage device 320.

Once a conversation stub has been created regarding an interrupted topic of conversation, the conversation stub may be utilized to remind a user of the topic of the interrupted conversation. Consider, for example, that the interrupted topic of conversation relates to WebSphere® software, and that during the conversation, the user asked the other party to the conversation some questions regarding the software which were never answered as a result of the interruption. The user may still desire answers to the questions but doesn't want to wait until the next time he/she communicates with the other party. The user would be happy to get the answers to his/her questions from any party that can provide the answers.

According to an exemplary embodiment, system 300 includes a capability of determining whether any party with whom the user is communicating has expertise in the subject of the conversation stub so as to be likely to be able to answer the questions. If it is determined that a particular party possesses such expertise, the conversation stub is presented to the user during the conversation with the particular party to so remind the user of the questions and to advise the user of the particular party's expertise with respect to the subject matter.

According to an exemplary embodiment, whenever user 304 communicates with another party, either by using communication device 302 or another communications device upon which the user has been authenticated, system 300 queries the other party's "expert rating" with respect to the subject matter stored by the conversation stub, e.g., WebSphere® software. The expert rating is a relative ranking/rating for a person in a particular field. A person may, for example have a high rating in one field, and thus qualify as having expertise in that field, but have a low rating in another field. If it is determined that the party with whom the user is communicating qualifies as having expertise in the subject matter of the conversation stub, i.e., in WebSphere® software, the conversation stub is provided to the user so that the user is made aware of the subject matter of the conversation stub and that the other party has expertise in the subject matter so that the user, if he/she so desires, may ask the other person the unanswered questions from the original interrupted conversation.

According to an exemplary embodiment, storage device 320 comprises a "smart" card that enables a conversation stub 322 stored therein to communicate with another smart device via a wireless network such as a cell phone network, WiFi, WiMax, Bluetooth, or the like using connections already provided by the smart device.

According to an exemplary embodiment, the conversation stub may also include a summarizing mechanism 324 for summarizing the contents of conversation stub 322. Summarizing mechanism 324 may, for example, utilize a summarizing capability as currently exists in word processing programs such as Microsoft® Word® software to cull out important words of a conversation. Alternatively, as indicated previously, the conversation stub may already be in a summarized form and not require further summarizing.

Once the important words have been identified, an expertise querying mechanism 326 is utilized to determine if the party has expertise in the subject matter of the conversation stub. An expert rating of the other party in the subject matter may be gathered via a Web service to one or more on-line expert repositories, schematically illustrated at 328, which have open Web service standards that allow queries on registered user's expertness in given subject areas. One example of a suitable on-line reputation site is "opinity.com" although it should be understood that it is not intended to limit exemplary embodiments to any particular information source. The conversation stub utilizes these open query standards to inquire about the expertise of the other party to a conversation.

The conversation stub can identify the party being communicated with by the user using voice recognition, by recognizing a phone number of the party or in another manner. When the party is identified, the conversation stub determines the speaker's expertise in the subject matter of the conversation stub; and upon determining that the speaker has sufficient expertise, presents itself on the users communications device in order to advise the user about the subject matter of the interrupted conversation and that the other party has expertise in the subject matter of the conversation so that the user can ask questions to the other party if he/she so desires.

According to an exemplary embodiment, once the subject has been discussed, the conversation stub may delete itself from storage. This may be done, for example, using voice recognition to recognize that the subject of the conversation stub was, in fact, discussed. Alternatively, the user can designate that the conversation stub be removed after the questions have been satisfactorily answered.

According to an exemplary embodiment, communication device 302 or a remote storage device may store any number of conversation stubs relating to any number of incomplete conversations. During a subsequent conversation with another party using the communications device, each conversation stub can determine the expertise of the other party with respect to the subject matter it has stored and provide itself to the user when an expert is identified.

According to yet a further exemplary embodiment, a conversation stub may be broadcast out via a Web service to all devices that contain the conversation stub and identify itself either using parts of the conversation stub, a unique ID or a timestamp, to all devices with which it has interacted, notifying them to delete the conversation stub as well.

Figure 4:
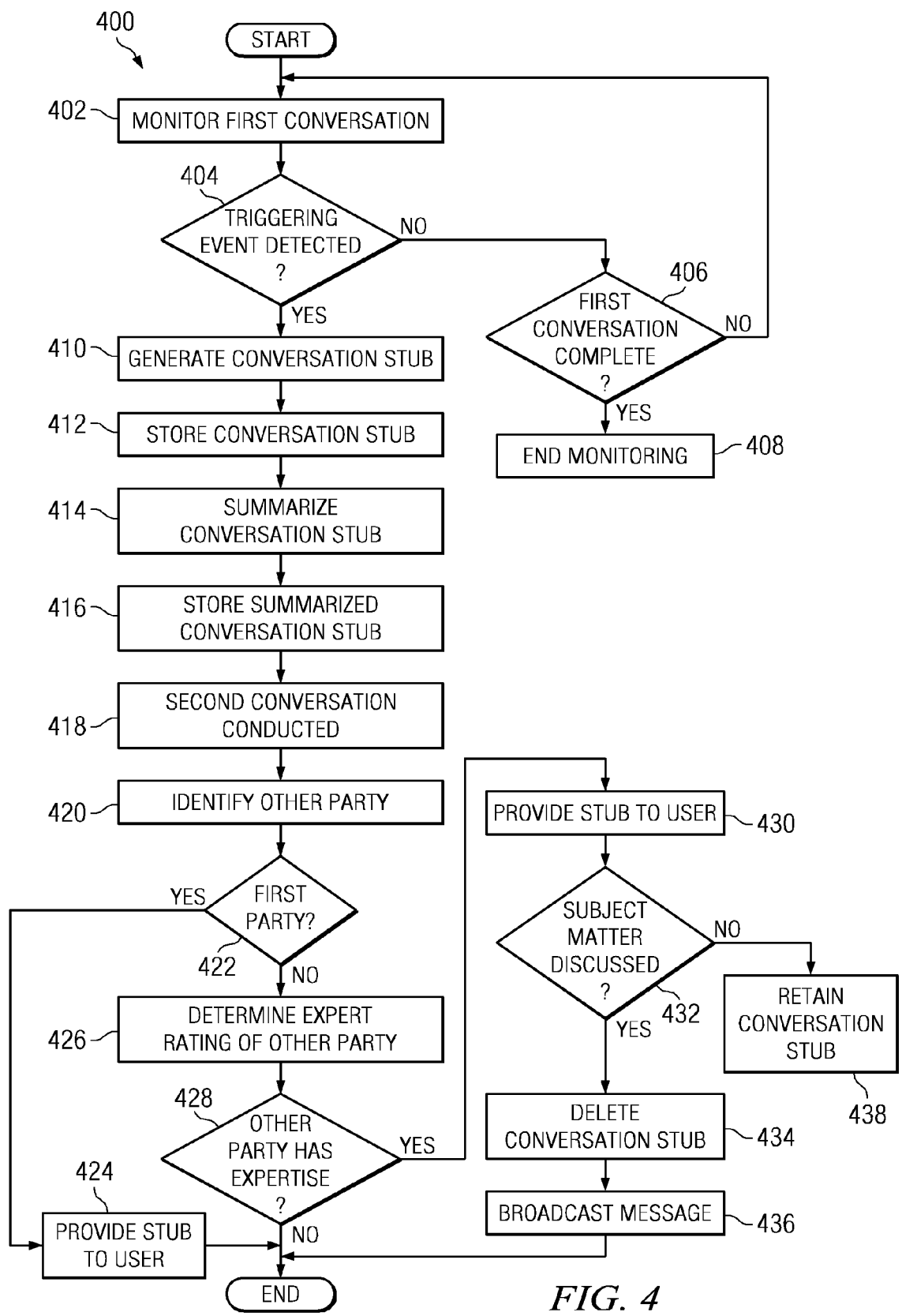
FIG. 4 is a flowchart that illustrates a method for managing conversational input according to an exemplary embodiment.

FIG. 4 is a flowchart that illustrates a method for managing conversational input according to an exemplary embodiment. The method is generally designated by reference number 400, and begins by monitoring a first conversation between a user of a communication device and a first party (Step 402). A determination is made whether a triggering event that is indicative of an interruption of a topic of conversation of the first conversation is detected (Step 404). If a triggering event is not detected (No output of Step 404), a determination is made whether the first conversation has been completed (Step 406). If the first conversation has been completed (Yes output of Step 406), the monitoring ends (Step 408). If the conversation has not been completed (No output of Step 406), the method returns to Step 402 to continue monitoring the first conversation.

If a triggering event is detected during monitoring of the first conversation (Yes output of Step 404), a conversation stub is generated that includes information regarding the interrupted topic of the first conversation (Step 410), and the conversation stub is stored (Step 412).

The conversation stub may then summarize itself to cull important words out of the stored conversation stub (Step 414) and stores the summary (Step 416).

A second conversation is then conducted between the user and another party (Step 418). The second conversation may be initiated by the user or by the other party, and may include authentication of the user. The other party may be the first party of the first conversation or a different party. The other party to the conversation is identified (Step 420). A determination is made whether the identified party is the same party as in the first conversation, i.e., the first party (Step 422). If it is determined that the other party is the first party (Yes output of Step 422), the conversation stub is provided to the user to remind him of the topic of the interrupted first conversation so that the user may again ask the questions to the first party (Step 424) and the method ends.

If it is determined that the other party is not the same party as the first party, i.e., is a different second party (No output of Step 422), an expert rating of the second party is determined (Step 426), and a determination is made whether the second party qualifies as an expert, i.e., has expertise, in the subject matter of the conversation stub (Step 428). If it is determined that the second party has expertise in the subject matter (Yes output of Step 428) the stub is provided to the user (Step 430). If it is determined that the second party does not have expertise in the subject matter of the conversation (No output of Step 428), the conversation stub is not presented to the user and the method ends.

The second conversation may be monitored to determine whether the subject matter of the conversation stub was discussed during the second conversation (Step 432). If it is determined that the subject matter was discussed (Yes output of Step 432), the conversation stub may be deleted from storage (Step 434), and a message may be broadcast to other communications devices storing the conversation stub that their conversation stub may be deleted from their smart card (Step 436), and the method ends.

If it is determined that the subject matter of the conversation stub was not discussed during the second conversation (No output of Step 432), the conversation stub is retained in memory, for example, for a subsequent conversation (Step 438), and the method ends.

Exemplary embodiments thus provide a computer implemented method, system and computer usable program code for managing conversational input. A first conversation between a user of a communications device and a first party is monitored. A conversation stub that includes information relating to a topic of the first conversation is generated and stored. It is determined whether a second party of a second conversation between the user of the communications device and the second party has expertise regarding the topic of the first conversation. Responsive to determining that the second party has expertise regarding the topic of the first conversation, the conversation stub is presented to the user during the second conversation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/w) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing conversational input, comprising:
   monitoring a first oral conversation between a user of a communications device and a first party;
   automatically detecting, by a processing unit operably connected to the communications device, a triggering event by detecting more than one voice at a time during the first oral conversation, wherein the triggering event is an interruption during an oral statement begun by one of the user and the first party;
   responsive to detecting the triggering event, generating a conversation stub that includes words spoken during the oral statement before the oral statement was interrupted and a topic of the first oral conversation;
   storing the conversation stub;
   responsive to detecting a second oral conversation occurring between the user of the communications device and a second party, determining whether the second party has expertise regarding the topic of the first oral conversation, wherein expertise regarding a topic is an above average ranking of an individual's knowledge of the topic when compared with other individuals' knowledge of the topic;
   responsive to determining that the second party has expertise regarding the topic of the first oral conversation, presenting the conversation stub to the user in a graphical user interface of the communications device during the second conversation; and
   responsive to determining that the interruption has ended, presenting the conversation stub to the user in the graphical user interface of the communications device during one of the first oral conversation and a subsequent oral conversation between the user and the first party.

2. The computer implemented method of claim 1, wherein determining whether a second party of a second conversation between the user of the communications device and the second party has expertise regarding the topic of the first oral conversation, comprises:
   querying an expert repository regarding the expertise of the second party.

3. The computer implemented method of claim 2, wherein the expert repository comprises an on-line expert repository.

4. The computer implemented method of claim 1, and further comprising:
   determining whether the topic of the first oral conversation has been discussed during the second conversation; and
   responsive to determining that the topic of the first oral conversation has been discussed during the second conversation, deleting the stored conversation stub and broadcasting a message to other communications devices storing the conversation stub to delete their respective conversation stubs.

5. The computer implemented method of claim 1, wherein the first oral conversation is a call between the user and the first party placed on the communications device and wherein automatically detecting the triggering event during the first oral conversation further comprises:
   automatically detecting, by the processing unit operably connected to the communications device, the triggering event by detecting that the call between the user and the first party was dropped during the first oral conversation.

6. The computer implemented method of claim 1, wherein automatically detecting the triggering event during the first oral conversation further comprises:
   automatically detecting, by the processing unit operably connected to the communications device, the triggering event by detecting that the user has uttered a predefined voice command during the first oral conversation.

7. The computer implemented method of claim 1, wherein automatically detecting the triggering event in the first oral conversation further comprises:
   automatically detecting, by the processing unit operably connected to the communications device, the triggering event by detecting a raised tone of voice by one of the user and the first party during the first oral conversation.

8. The computer implemented method of claim 1, wherein storing the conversation stub, comprises:
   summarizing the information relating to a topic of the first oral conversation to form a summarized conversation stub; and
   storing the summarized conversation stub.

9. A computer program product, comprising:
   a non-transitory computer readable storage medium storing computer usable program code for managing conversational input, the computer program product comprising:
   computer usable program code configured for monitoring a first oral conversation between a user of a communications device and a first party;
   computer usable program code configured for automatically detecting a triggering event by detecting more than one voice at a time during the first oral conversation, wherein the triggering event is an interruption during an oral statement begun by one of the user and the first party;
   responsive to detecting the triggering event, computer usable program code configured for generating a conversation stub that includes words spoken during the oral statement before the oral statement was interrupted and a topic of the first oral conversation;
   computer usable program code configured for storing the conversation stub;
   responsive to detecting a second oral conversation occurring between the user of the communications device and a second party, computer usable program code configured for determining whether the second party has expertise regarding the topic of the first oral conversation, wherein expertise regarding a topic is an above average ranking of an individual's knowledge of the topic when compared with other individuals' knowledge of the topic;
   responsive to determining that the second party has expertise regarding the topic of the first oral conversation, computer usable program code configured for presenting the conversation stub to the user in a graphical user interface of the communications device during the second conversation; and
   responsive to determining that the interruption has ended, computer usable program code configured for presenting the conversation stub to the user in the graphical user interface of the communications device during one of the first oral conversation and a subsequent oral conversation between the user and the first party.

10. The computer program product of claim 9, and further comprising:
    computer usable program code configured for detecting the triggering event in the first oral conversation indicating that the first oral conversation has been interrupted, wherein the computer usable program code configured for generating a conversation stub that includes information relating to a topic of the first oral conversation, comprises:
  computer usable program code configured for generating the conversation stub in response to detecting the triggering event.

11. The computer program product of claim 9, wherein the computer usable program code configured for determining whether a second party of a second conversation between the user of the communications device and the second party has expertise regarding the topic of the first oral conversation, comprises:
  computer usable program code configured for querying an expert repository regarding the expertise of the second party.

12. The computer program product of claim 11, wherein the expert repository comprises an on-line expert repository.

13. The computer program product of claim 9, and further comprising:
  computer usable program code configured for determining whether the topic of the first oral conversation has been discussed during the second conversation; and
  responsive to determining that the topic of the first oral conversation has been discussed during the second conversation, computer usable program code configured for deleting the stored conversation stub.

14. The computer program product of claim 9, wherein the computer usable program code configured for storing the conversation stub, comprises:
  computer usable program code configured for summarizing the information relating to a topic of the first oral conversation to form a summarized conversation stub; and
  computer usable program code configured for storing the summarized conversation stub.

15. A system for managing conversational input, comprising:
  a communications device;
  a monitoring mechanism for monitoring a first oral conversation between a user of the communications device and a first party;
  at least one processing unit operably connected to the communications device, for automatically detecting, by a processor, a triggering event by detecting more than one voice at a time during the first oral conversation, wherein the triggering event is an interruption during an oral statement begun by one of the user and the first party;
  responsive to detecting the triggering event, a conversation stub generator for generating a conversation stub that includes words spoken during the oral statement before the oral statement was interrupted and a topic of the first oral conversation;
  a storage device for storing the conversation stub;
  responsive to detecting a second oral conversation occurring between the user of the communications device and a second party, a determining mechanism for determining whether the second party has expertise regarding the topic of the first oral conversation, wherein expertise regarding a topic is an above average ranking of an individual's knowledge of the topic when compared with other individuals' knowledge of the topic;
  responsive to determining that the second party has expertise regarding the topic of the first oral conversation, a presenting mechanism for presenting the conversation stub to the user in a graphical user interface of the communications device during the second conversation; and
  responsive to determining that the interruption has ended, a presenting mechanism for presenting the conversation stub to the user in the graphical user interface of the communications device during one of the first oral conversation and a subsequent oral conversation between the user and the first party.

16. The system of claim 15, and further comprising:
  a detector for detecting the triggering event in the first oral conversation indicating that the first oral conversation has been interrupted, wherein the conversation stub generator generates the conversation stub in response to detecting the triggering event.

17. The system of claim 15, wherein the determining mechanism comprises a querying mechanism for querying an expert repository regarding the expertise of the second party.

18. The system of claim 17, wherein the expert repository comprises an on-line expert repository.

19. The system of claim 15, wherein the communications device comprises one of a cellular telephone, a personal digital assistant (PDA), and a computer.

* * * * *